United States Patent
Dwyer et al.

(10) Patent No.: US 7,809,507 B2
(45) Date of Patent: Oct. 5, 2010

(54) LIGHTNING DETECTOR USING AN X-RAY DETECTOR AND AN E- OR B-FIELD DETECTOR

(75) Inventors: Joseph R. Dwyer, W. Melbourne, FL (US); Martin A. Uman, Alachua, FL (US); Hamid K. Rassoul, W. Melbourne, FL (US); Jason Jerauld, Gainesville, FL (US); Douglas M. Jordan, Archer, FL (US); Keith J. Rambo, Gainesville, FL (US); Vladimir A. Rakov, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 314 days.

(21) Appl. No.: 11/721,280

(22) PCT Filed: Dec. 12, 2005

(86) PCT No.: PCT/US2005/044950

§ 371 (c)(1),
(2), (4) Date: Nov. 15, 2007

(87) PCT Pub. No.: WO2006/063351

PCT Pub. Date: Jun. 15, 2006

(65) Prior Publication Data

US 2009/0234583 A1    Sep. 17, 2009

Related U.S. Application Data

(60) Provisional application No. 60/635,100, filed on Dec. 10, 2004.

(51) Int. Cl.
*G01W 1/00* (2006.01)

(52) U.S. Cl. ............................. 702/4; 324/72; 340/601

(58) Field of Classification Search ............... 702/4; 73/170.24; 324/72, 72.5; 340/601
See application file for complete search history.

(56) References Cited

U.S. PATENT DOCUMENTS

| 4,245,190 A | * | 1/1981 | Krider et al. .................. 324/72 |
| 4,276,576 A | * | 6/1981 | Uman et al. .................. 361/1 |
| 5,083,042 A | | 1/1992 | Merchant et al. |

OTHER PUBLICATIONS

Moore, C. B. et al. "Energetic Radiation Associated with Lighting Stepped-Leaders", Geophysical Research Letters, American Geophysical Union, (2001), vol. 28, No. 11, pp. 2141-2144.*
Moore C. B. et al. "Energetic radiation associated with lightning stepped-leaders", Geophysical Research Letters American Geophys. Union, (2001), vol. 28, No. 11, pp. 2141-2144.

* cited by examiner

*Primary Examiner*—Manuel L Barbee
(74) *Attorney, Agent, or Firm*—Saliwanchik, Lloyd & Saliwanchik (57) ABSTRACT

A lightning detection system (100) includes at least one lightning detector (101-103). The said lightning detector (101-103) includes at least one x-ray detector (110) for providing x-ray data responsive to x-rays received, and an electric field or magnetic field detector (115) for providing electric field or magnetic field data responsive to electric field or magnetic field received. At least one signal processor (122) is coupled to the x-ray detector and the electric field or magnetic field detector. The processor (122) determines whether lightning will strike or has struck proximate to the lightning detector(s) (101-103) based on the x-ray data and electric field or magnetic field data, and can provide a strike point indication having an accuracy of generally better than (100) m.

36 Claims, 6 Drawing Sheets

LIGHTNING DETECTOR USING AN X-RAY DETECTOR AND AN E- OR B-FIELD DETECTOR

CROSS-REFERENCE TO RELATED APPLICATIONS

This application is the national stage entry of International Application No. PCT/US2005/044950, filed Dec. 12, 2005, which claims priority to U.S. Provisional Application No. 60/635,100, filed Dec. 10, 2004.

STATEMENT REGARDING FEDERALLY SPONSORED RESEARCH OR DEVELOPMENT

The U.S. Government has certain rights to the invention based on National Science Foundation Grant No. DGE9616053.

FIELD OF THE INVENTION

The invention relates to lightning detection and warning systems, and systems which, by providing a warning of an impending lightning strike, prevent lightning from damaging electronic devices.

BACKGROUND

Despite decades of research, the physics of lightning leader propagation remains poorly understood. Observations have shown that lightning's initial path to the ground is forged by a hot leader that breaks down the virgin and electrically insulating air in front of it and thus allows electrical current to flow in the channel behind the front. This process can continue for great distances, permitting the initially localized breakdown inside the thundercloud to traverse many kilometers of air to the ground where it can potentially cause injury to people and damage to property.

The initial leader is known to not travel to the earth in a continuous manner, but, instead, takes a series of discrete steps. For this reason, the initial leader in natural cloud-to-ground lightning is referred to as the stepped-leader. Why or how lightning propagates in this halting manner is not known, but one possible scenario based upon laboratory spark experiments is that during the stepping process, a new leader channel segment is initiated in a high electric field region some distance in front of the stalled leader. This new segment attaches to the old leader channel, allowing current to rush along the channel and extending its overall length. The leader propagation then stalls and the whole cycle repeats. Because the process of stepping determines the path that lightning takes and the number of forks and branches that develop, understanding how lightning steps occur is of great practical interest. It has applications for the wider fields of atmospheric science, gas discharge physics, plasma physics, and planetary sciences, as well as lightning safety and protection devices for both humans, animals and electronic and utility power equipment. Additionally, it is of significant interest to subsidiary fields such as the insurance industry and electric power utilities to ascertain whether lightning has struck an object or structure.

Up until recently most researchers believed that lightning was an entirely conventional, albeit large, discharge that did not involve any high-energy processes that might produce energetic radiation. This view was challenged in 2001 when Moore et al. published a paper entitled "Energetic radiation associated with lightning stepped-leaders" (Geophys. Res. Lett. 28, 2141-2144, 2001; hereafter "Moore") which reported that "energetic radiation" which could be electrons or high energy photons (gamma rays or x-rays), is produced during natural lightning. Moore did not report regarding the energy spectrum of the disclosed energetic radiation nor any temporal characteristics other than the start time of the energetic radiation relative to the time of the ground return stroke. In addition, Moore did not provide reliable estimates of the energetic radiation source location, and could not rule out more remote sources of the energetic radiation which would prevent a determination of the strike location based upon the energetic radiation measurements. Moreover, Moore did not estimate the intensity of the energetic radiation at the source nor the distance that it propagates through the air, since such information requires knowledge of the type of energetic radiation and its energy spectrum.

Presently about 85 to 90% of lightning flashes can be located with an average accuracy of 500 meters (the remaining percentage not being detected at all) by the U.S. National Lightning Detection Network (NLDN) and similar networks in other countries. The strike location is identified by timing and direction finding on the lightning RF (about 10 kHz to about 300 kHz) signal. A method and system which provides better localization, such as to 100 meters or better, would be highly desirable to substantially more accurately determine whether a given location was in fact struck by lightning. Such a determination can be important particularly regarding insurance claim related issues.

SUMMARY

A lightning detection system comprises at least one lightning detector. The lightning detector comprises at least one x-ray detector for providing x-ray data responsive to x-rays received, an electric field or magnetic field detector for providing electric field or magnetic field data responsive to electric field or magnetic field received. At least one signal processor is coupled to the x-ray detector and the electric field or magnetic field detector. The processor determines whether lightning will strike or has struck proximate to the lightning detector based on the x-ray data and electric field or magnetic field data. The processor preferably determines whether lightning will strike or has struck based on coincidence of the x-ray data and electric field or magnetic field data.

An electrically conductive enclosure can be included for enclosing the x-ray detector, electric field or magnetic field detector, and processor, for keeping out moisture, light, and RF noise. The system can further comprises an antenna coupled to the electric field or magnetic field detector.

The processor generally monitors at least one of temporal, energy-related or intensity characteristics of the x-ray data and electric field or magnetic field data and determines whether the x-ray data and electric field or magnetic field data has the temporal, energy related or intensity characteristics in respective predetermined ranges predetermined to be associated with lightning. A recorder can be provided for recording the x-ray data and electric field or magnetic field data. The system preferably also includes a clock for providing a date and time of day associated with x-ray data and electric field or magnetic field data.

The system preferably comprises a plurality of said lightning detectors spaced apart from one another. The system can further comprise circuitry for shunting high voltage associated with the lightning away from a power connector to electrical or electronic comprising circuitry. In this embodiment, the circuitry for shunting high voltage being is communicably connected and activated by a signal from the lightning detector upon the processor determining that the lightning will strike. The electric field data preferably includes electric field time derivative data.

A method of lightning detection, comprising the steps of obtaining x-ray data and electric field or magnetic field data received at least one location, and processing the x-ray data and electric field or magnetic field data, wherein the processor determines whether lightning will strike or has struck proximate to the location based on coincidence of the x-ray data and electric field or magnetic field data. The method can further comprise the step of activating a lightning protection device which protects electronics after the processor determines that the lightning will strike before a ground stroke event. The method preferably utilizes electric field time derivative data. The method can further comprise the step of determining a location of a ground stroke event within 100 m of an actual location of the ground stroke event, such as within a range of 50 to 100 m.

BRIEF DESCRIPTION OF THE DRAWINGS

There is shown in the drawings embodiments which are presently preferred, it being understood, however, that the invention can be embodied in other forms without departing from the spirit or essential attributes thereof.

DETAILED DESCRIPTION

A lightning detection system comprises at least one lightning detector. The lightning detector includes at least one x-ray detector for providing x-ray data responsive to x-rays received, an electric field and/or a magnetic field detector for providing electric field or magnetic field data responsive to electric fields or magnetic fields received. At least one signal processor is coupled to the x-ray detector and the electric field or magnetic field detector. The processor determines whether lightning will strike or has struck proximate to the lightning detector based on x-ray data and the electric field or magnetic field data. As used herein, "proximate" to the lightning detector refers to a distance of generally less than 1 km, such as 400 m or 300 m, or about 100 m in a preferred embodiment. The system can provide a strike point indication having an accuracy of generally better than 100 m.

Lightning monitoring, warning and protection systems and related methods according to the invention are based on new findings regarding natural negative cloud-to-ground lightning. These findings demonstrate that the production of a series of brief x-ray bursts is associated with the stepping of the leader that initiates the first return stroke. The energy of the x-ray bursts has been found to be generally from about 10 to 300 keV. Each x-ray burst has been found to have a duration of less than about 1 µsec. As used herein, "x-rays" is defined as energetic photons with energies above 1 keV, including energetic photons in the multi-MeV range, regardless of the source mechanism involved in producing them.

It has been found that x-rays from lightning leader steps are observable from several hundred meters for up to 1 ms before the first return stroke. Accordingly, x-ray detectors based on the invention can be used to accurately predict the strike location before it occurs, and, after the fact, whether lightning has indeed stuck a given location. X-ray detector-based lightning warning and protection systems based on the invention can also be configured.

Moreover, it has been found that the electric field (E) experiences a sudden change in its waveform appearing as a step that occurs substantially coincident with the receipt of the x-ray burst. As defined herein "substantially coincident" refers to respective times within no more than about 1 µsec. Measurements of dE/dt can be independently taken or derived from E measurements, provided the E data measurement system provides sufficient bandwidth. dE/dt data have been found to provide characteristic triangular shaped pulses which facilitate their identification over E pulses associated with lightning. Both E steps and dE/dt triangular shaped pulses have been found to be observable at distances of about 100 m or less using the equipment utilized in experiments performed. This short distance detection property of E and dE/dt allows the position of the ground return stroke to be closely determined. Magnetic field signals have also found to be pulses substantially coincident with the x-ray bursts. In contrast to E field steps, characteristic magnetic field signals associated with lightning step leaders have been detectable at distances far beyond 100 m.

In a preferred embodiment, systems according to the invention also include an electric field or magnetic field detector. As used herein, the phrase "electric field detector" includes a detector system that can also provide first and second electric field (time) derivatives, while the phrase "magnetic field detector" can include a detector system that provides first and second magnetic field (time) derivatives. Such a detector can directly provide the desired field derivative data directly, or in cooperation with signal processing software acting on electric field or magnetic field data detected by the detector.

A low level background of energetic particles is normally present in the atmosphere of the earth primarily due to atmospheric cosmic-rays (mostly muons and electrons) and radioactive decay. Such energetic particles introduce background counts into the lightning x-ray measurements. However, it has been found that the intensity of x-rays from lightning is large enough that it is distinguishable from the background sources. The pulse nature of x-rays generated by lightning as well as their energy spectrum have also been found to be distinct from atmospheric x-ray sources which are fairly constant over the short timescales of interest for lightning detection, even when the variations due to radon daughter product washout are included. As a result, it has been found that such background can be accurately subtracted out.

However, in certain applications, fluctuations in the background rate due to cosmic-ray air showers may need to be addressed. One method of virtually eliminating this potential problem which can cause false triggers is by using x-ray coincidence with an electric field or magnetic field, or their derivatives. Another method of virtually eliminating this problem is by using two or more x-ray detectors or an x-ray detector and one or more energetic particle detectors in proximity, such as in the same box. If one detector is a Geiger counter (detects muons only), for example, and the detector is a conventional photomultiplier tube (PMT), muons can be discriminated from lightning generated x-rays.

Although the invention is described as including an x-ray detector along with an additional optional electric or magnetic field detector, the invention is in no way limited to this arrangement. Because of the finding by the inventors that leader step electric fields and characteristic electric field derivative signals are only present when the leader is very close, one embodiment of the invention uses the presence of leader step electric field and/or the characteristic close step electric field derivative signals alone to predict an impending return stroke and whether lightning has actually hit a spot or is within about 100 m.

Figure 1:
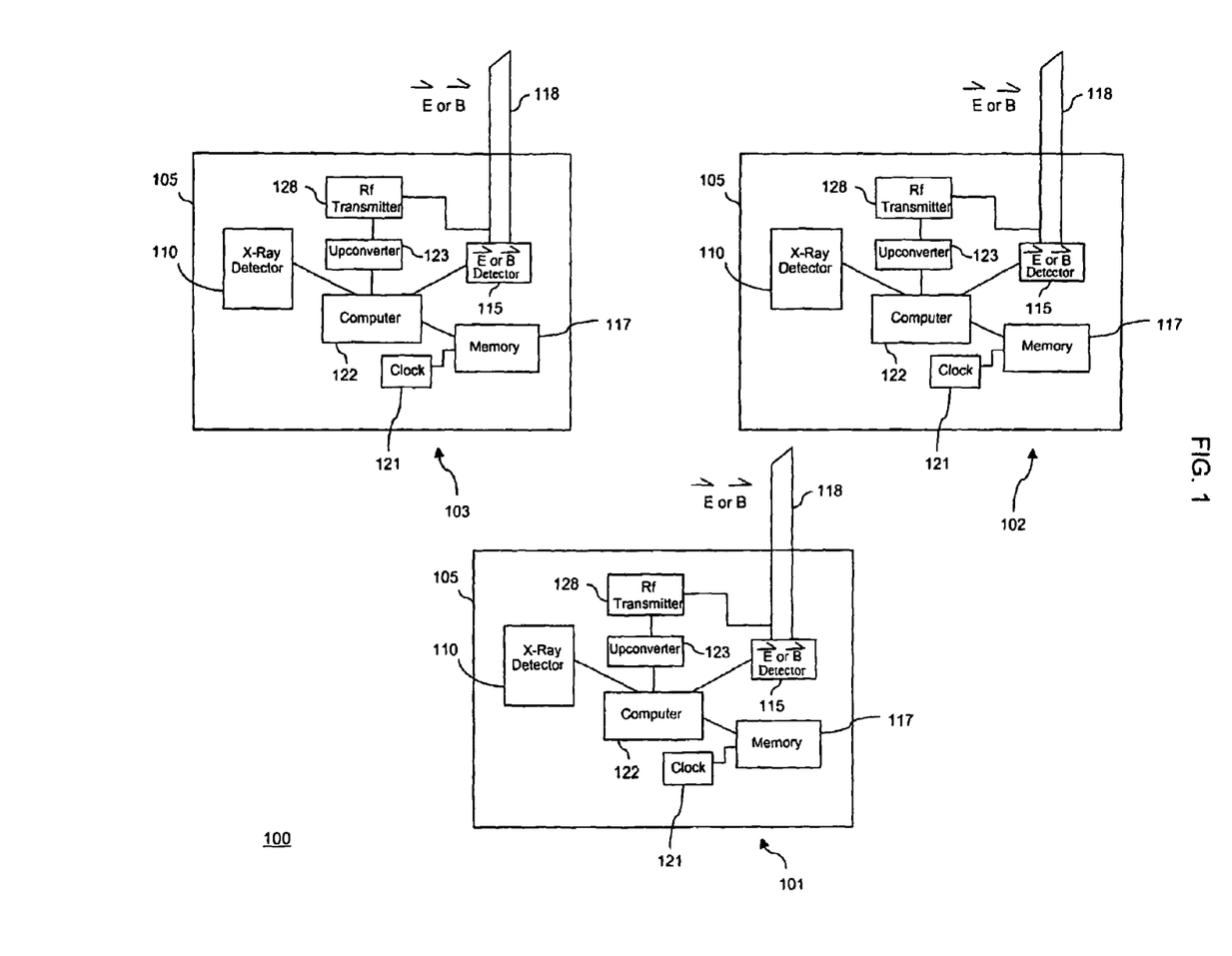
FIG. 1 shows a block diagram of a lightning detection system comprising an array of lightning detectors, according to an embodiment of the invention.

A block diagram of an exemplary lightning monitoring and early warning system 100 is shown in FIG. 1 comprising three (3) spaced apart lightning detectors 101, 102 and 103. detectors 101-103 include a metal box 105 which houses the various detector components and is designed to keep out moisture, light, and RF noise. Metal box 105 is preferably a fireproof box, and may also be a crush resistant box. Embodied as a fire proof box 105, box 105 can preserve the integrity of x-ray and/or filed data acquired proximate to a ground return stroke should the system experience a fire. In avionic applications, box 105 is also preferably crush resistant, so that the data can survive a plane crash, analogous to a "black box".

Detectors 101-103 include an x-ray detector 110, such as a NaI PMT. System 100 also includes an electric field detector and/or magnetic field detector 115. Detector 115 is shown connected to antenna 118. The magnetic field detector 115 can be a Hall effect detector. Detectors 110 and 115 both output electrical signals. A microprocessor or other computing device 122 running analysis software based on the invention receives electrical signals from detectors 110 and 115 and determines whether x-ray data or electric field and/or magnetic field data received is associated with an impending ground stroke. Microprocessor or other computing device 122 can provide time derivatives of the electric field and magnetic field data received. In that case, a microprocessor warning signal is encoded, upconverted by upconverter 123 and transmitted by RF transmitter 128 over antenna 118 to one or more remote locations which enables action to be taken prior to receipt of the impending ground stroke, such as the opening of an electrical circuit. When the detector components are disposed inside an enclosure and an electric field or magnetic field detector is included, as shown in FIG. 1, antenna 118 preferably emerge from the enclosure 105 to receive the field data to limit attenuation of the signal to be detected.

Lightning detectors 101-103 also include a recorder (e.g. non-volatile memory) 117 for recording the x-ray data and the electric field or magnetic field data. Lightning detectors 101-103 also include a clock 121 coupled to the recorder 117 for providing a date and time of day associated with the x-ray data and electric field or magnetic field data.

Lightning strikes are known to activate a variety of security devices and thus create false alarms. Using the invention, the timing and location of an impending lightning strike can be determined by appropriate software based on analysis of received x-ray data along with optional electric field and/or magnetic field data. Prior knowledge of the timing and location of an impending lightning can be used to avoid false alarms, such as by transmitting a warning signal that actuates an electronic switch that disables the security device. Transmissions are preferably over-the-air, but can also be wired or fiber-optic communication links.

The invention has applications for the home or office. Electrical and electronic equipment, particularly electronic equipment including using microelectronics and integrated circuits, are generally sensitive to electrical surges coming through external electrical conductors such as telephone lines, coaxial cable, digital and analog connections, low voltage control lines, and power conductors. These surges may result from lightning strikes or other catastrophic electrical events occurring within the power grid. Various lightning protection devices are currently available which protect electronic equipment from electrical surges and other undesirable electrical phenomenon. A common feature of some of these existing devices is to protect electrical and electronic equipment by disconnecting the equipment from external conductors before any actual surge exists. Generally, these protection devices disconnect the equipment being protected from external conductors in response to a sensor that detects the presence of dangerous atmospheric conditions near the protection device. For example, U.S. Pat. No. 5,453,899 to Page entitled "Lightning Protection Device," discloses a lightning protection device that physically interrupts the electrical connection between electrical and electronic equipment and the power grid when lightning is detected in the vicinity of the equipment by a radio frequency receiver tuned to a frequency that generates a voltage in response to radio frequency static in the general vicinity. U.S. Pat. No. 5,453,899 is hereby incorporated by reference into the present application.

Figure 2:
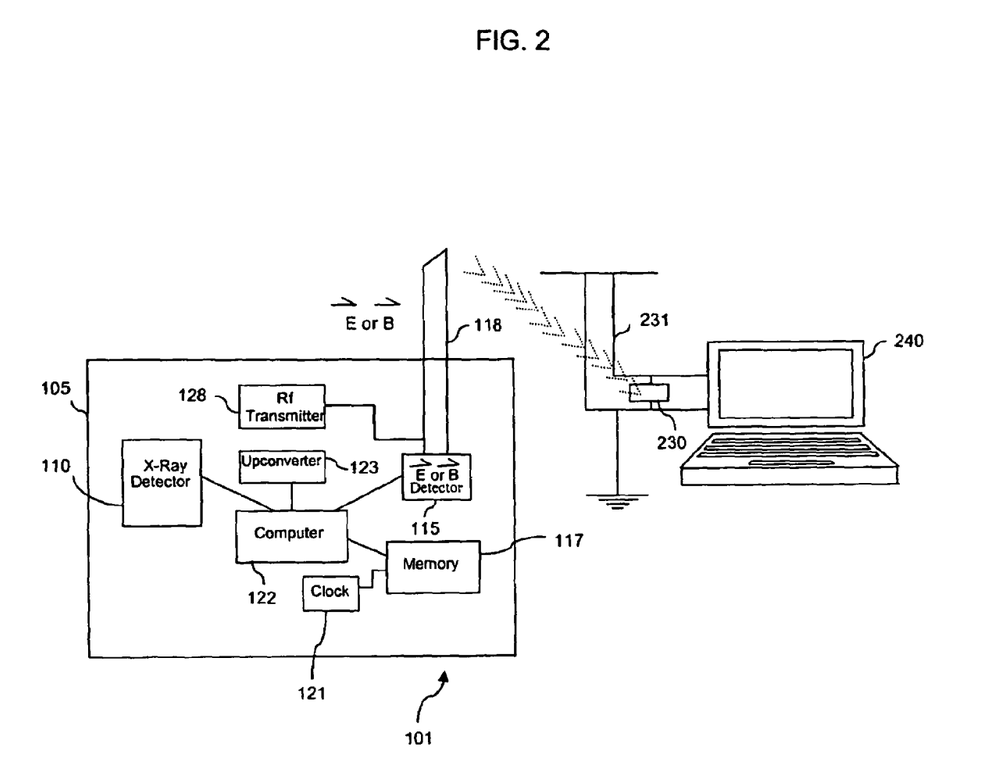
FIG. 2 shows use of a lightning detector according to the invention to predict the timing and location of an impending lightning strike and to initiate a signal which is used to protect an electronic device.

FIG. 2 shows use of a lightning detector 101 according to the invention to predict the timing and location of an impending lightning strike and to initiate a signal which is used to protect an electronic device. Upon determination of an impending lightning strike within a given area monitored by lightning detector 101, antenna 118 transmits a warning signal that actuates an electronic switch 230. Electronic switch 230 protects electronic device 240 by shunting power delivered to electronic device 240 by supply lines 231, such as to ground. Switch can be a silicon controlled rectifier (SCR) or other shunting device. Preferably, rather than protection through circuit interruption, the equipment to be protected 240 is connected to a protective network when lightning is detected to be in the vicinity, such provided by a triggered SCR which provides a shunt across the device immediately before the ground return stroke. Transmissions are preferably over-the-air as shown in FIG. 2, but can also be wired or fiber-optic communication links.

A lightning detection system according to an alternate embodiment of the invention which differs somewhat from the system described in the Examples used to acquire data described herein is now presented. The intensity and spectrum of x-rays from natural cloud-to-ground lightning at a distance of about 260 m shows that the x-rays become orders of magnitude more intense as the distance to the source is reduced. This feature allows smaller and less expensive plastic scintillators to be used in place of the 3" and 5" NaI(TI) scintillators used to make the measurements described in the Examples. For example, a 1" diameter by 1" thick plastic scintillator should be adequate to reliably detect x-rays from lightning at a distance of about 100 m. A lightning detection and warning system can comprise a 1" plastic scintillator photomultiplier tube (PMT) detector and a flat plate electric field antenna. The PMT anode signal would be directed to an amplifier/discriminator pair. An electric field deflection below a preset threshold would start an electronic counter attached to the discriminator output and would accumulate counts for a short time period or a series of short time periods, e.g. 0.01-2 msec. The background rate also can be monitored once every few seconds. If the count rate measured by the counter exceeds the measured background rate by some amount then the system triggers and records the time of the lightning-strike, and such quantities as the count rate and electric field deflection. A more sophisticated version of this system according to an alternate embodiment of the invention can also include a second detector such as a shielded scintillation/PMT detector or a gas filled counter to serve as a anticoincidence to discriminate against cosmic-ray air showers. Using large scintillator/PMT detectors and/or NaI(Tl) would increase the sensitivity of the system, allowing earlier detection and detection over a larger distance. Several such systems could be used to triangulate the exact location of the strike, and even predict the exact strike location before the strike occurs.

Homeland security can benefit from the invention. By eliminating or at least significantly reducing false alarms induced by lightning, combat readiness can be improved. For example, the North American Aerospace Defense Command (NORAD) and similar surveillance systems can benefit from the invention. In addition, security devices can be protected from lightning strikes, thus improving their reliability and up-time.

As noted relative to FIG. 2, the invention has applications for the home or office. in a preferred embodiment, the equipment to be protected is connected to an activated protective network when lightning is detected to be in the vicinity, such as by connecting in a surge protector (e.g. SCR) across the device immediately before the ground return stroke.

The insurance industry can also benefit from the invention. In the case of fire damage, an issue can arise whether the damage was caused by lightning, or some other cause, such as arson. By storing the detector and related system components in a fire proof box data along with a time stamp, it can be determined whether a lightning strike occurred at a particular time (or range of times) of interest.

Detection and warning systems according to the invention can be positioned in a variety of locations. For example, systems can be placed on utility power poles. Since systems according to the invention can provide lightning strike localization within 100 meters, or less, the invention provides significantly improved performance over RF-based lightning detection networks, such as the NLDN, which can only locate about 85 to 90% of lightning flashes with an average accuracy of 500 meters (the remaining percentage not being detected at all). As noted in the Background, improved strike localization is particularly important to the insurance industry, to e determine whether in fact a given claim is attributable to a lightning strike.

EXAMPLES

The present invention is further illustrated by the following specific examples, which should not be construed as limiting the scope or content of the invention in any way.

The measurements reported herein were made by eleven NaI(Tl)/photomultiplier tube x-ray detectors plus one control detector with no scintillator, along with 10 to 12 electric and magnetic field detectors at a research and testing center in Florida. Due to the short distance for detection of the E field data, such as about 100 m, or less, without the network of E field detectors used in the experiments performed, it is highly unlikely that E field data would have even been detected at all.

The x-ray detectors were mounted inside a total of 5 heavy aluminum boxes. The boxes were designed to keep out moisture, light, and RF noise, and placed at several locations at the facility with a maximum separation of about 60 m. The detectors and associated electronics within each box were battery powered and the output signals from the PMT anodes were transmitted via fiber-optic links to a Yokogawa DL750 Scope-Corder, having a sampling interval of 0.1 μs, located in a shielded trailer. Optical measurements were used to trigger the system, generally at the time of the first return stroke, when a nearby lightning strike occurred. The total record length was 2 s, with 0.5 s of pre-trigger delay in order to acquire data from the stepped-leader phase.

The configuration of the detectors used is summarized in Table 1 below. At the time of the natural lightning observations, seven of the detectors (Ch1-Ch7) were covered by collimators. The collimators each had a narrow (2°×20°) field-of-view and happened to be pointed away from the natural lightning strike locations. As a result, x-rays from the natural lightning were attenuated by the sides of the collimators. In addition, one detector was shielded by a tin-bronze attenuator cap. The remaining detectors were unshielded except for the aluminum windows on the boxes that contained them.

TABLE 1

Configuration of x-ray detectors

| Detector | NaI diameter (cm) | Al window thickness (cm) | Attenuator thickness (cm) | Distance from natural lightning strike (m) |
|---|---|---|---|---|
| Ch1 | 7.6 | 1.27 | 0.3 Pb + 1.9 bronze | 300 |
| Ch2 | 7.6 | 1.27 | 0.3 Pb + 1.9 bronze | 300 |
| Ch3 | 7.6 | 1.27 | 0.3 Pb + 1.9 bronze | 300 |
| Ch4 | 7.6 | 1.27 | 0.3 Pb + 1.9 bronze | 300 |
| Ch5 | 7.6 | 1.27 | 0.3 Pb + 1.9 bronze | 300 |
| Ch6 | 7.6 | 1.27 | 0.3 Pb + 1.9 bronze | 300 |
| Ch7 | 7.6 | 1.27 | 0.3 Pb + 1.9 bronze | 300 |
| Ch8 | 7.6 | 1.27 | 0.3 bronze | 300 |
| Ch9 | 7.6 | 1.27 | 0 | 300 |
| Ch10 | 7.6 | 0.32 | 0 | 310 |
| Ch11 | 12.7 | 0.32 | 0 | 260 |
| Ch12 (control) | 12.7 | 0.32 | 0 | 260 |

Figure 5A:
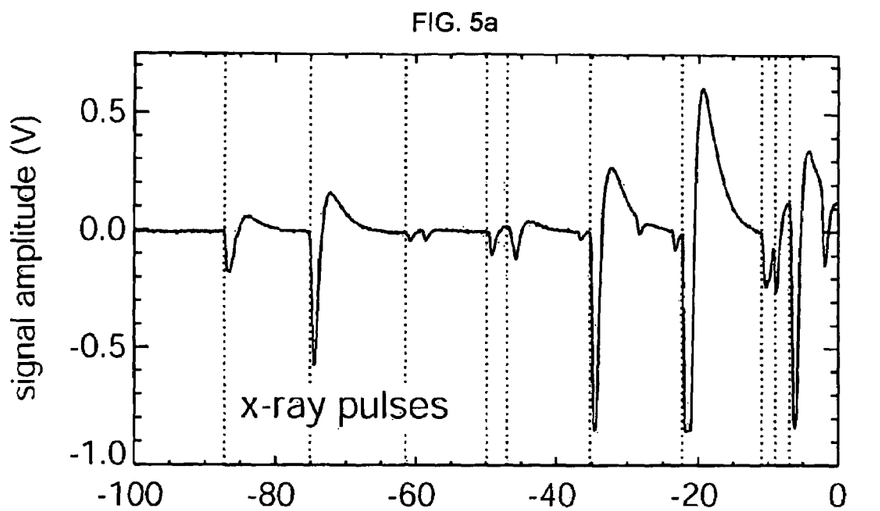
FIGS. 5(a) and (b) shows x-ray and electric field waveforms, respectfully, which preceded a first return ground stroke taken on another day. Electric field waveforms shown in FIG. 5(b) are again derived from integrated dE/dt waveforms.
Figure 5B:
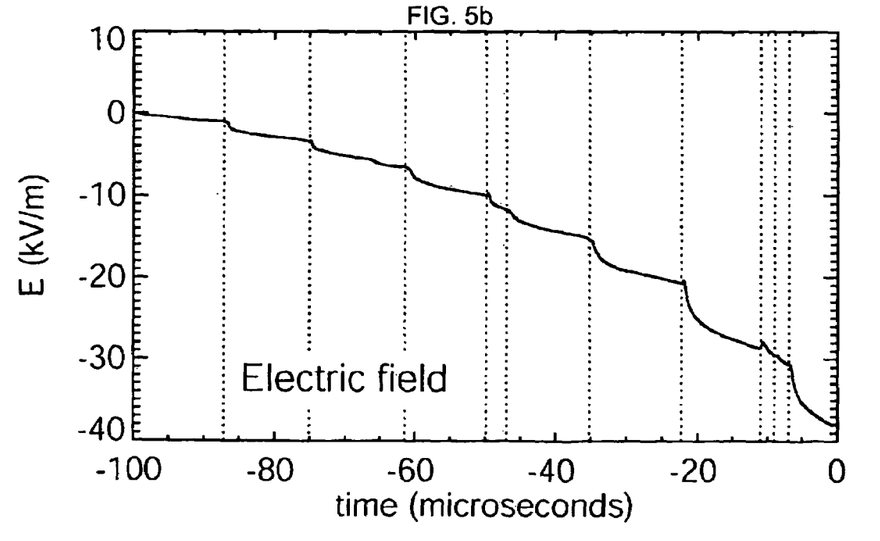

Along with the x-ray detectors, the research and testing center was equipped with instrumentation for measuring optical emission and electric and magnetic fields plus dE/dt measurements. dE/dt measurements have been found to be capable of recording very close leader stepping identifiable by characteristic waveshapes occurring at regular intervals (See FIG. 5, discussed below). These instruments were located at several locations throughout the 1 square km testing facility. dE/dt was measured with an aluminum flat-plate antenna, with the data transmitted over fiber-optic links and recorded on a LeCroy LT374 digital storage oscilloscope having a sampling interval of 5 ns and a total record length of 5 ms (4 ms pre-trigger). The upper frequency response of the dE/dt measurement instrument used was about 20 MHz. The electric field (E) was recorded in a similar fashion with an upper frequency response of about 4 MHz. Different electronics was used for the E and dE/dt measurements, since the dE/dt measurements require greater bandwidth due to extra information as compared to E measurement data. However, a single system and set of electronics could have been used to acquire both E and dE/dt data, provided the bandwidth would have been sufficient for the dE/dt measurements. E data may also be determined from integrating the dE/dt data.

During the summer in which tests were conducted, a total of 5 natural cloud-to-ground lightning flashes, all of which lowered negative charge to the ground, struck the testing center or its immediate vicinity. In all flashes measured, significant amounts of x-rays emission was measured.

In this example, two of these flashes are discussed which occurred on different days. The flashes measured provided excellent data because both first strokes terminated on the ground within about 50 m of a dE/dt sensor, allowing excellent electric field and electric field derivative and/or integration measurements of the few final leader steps before the ground connection occurred.

Figure 3:
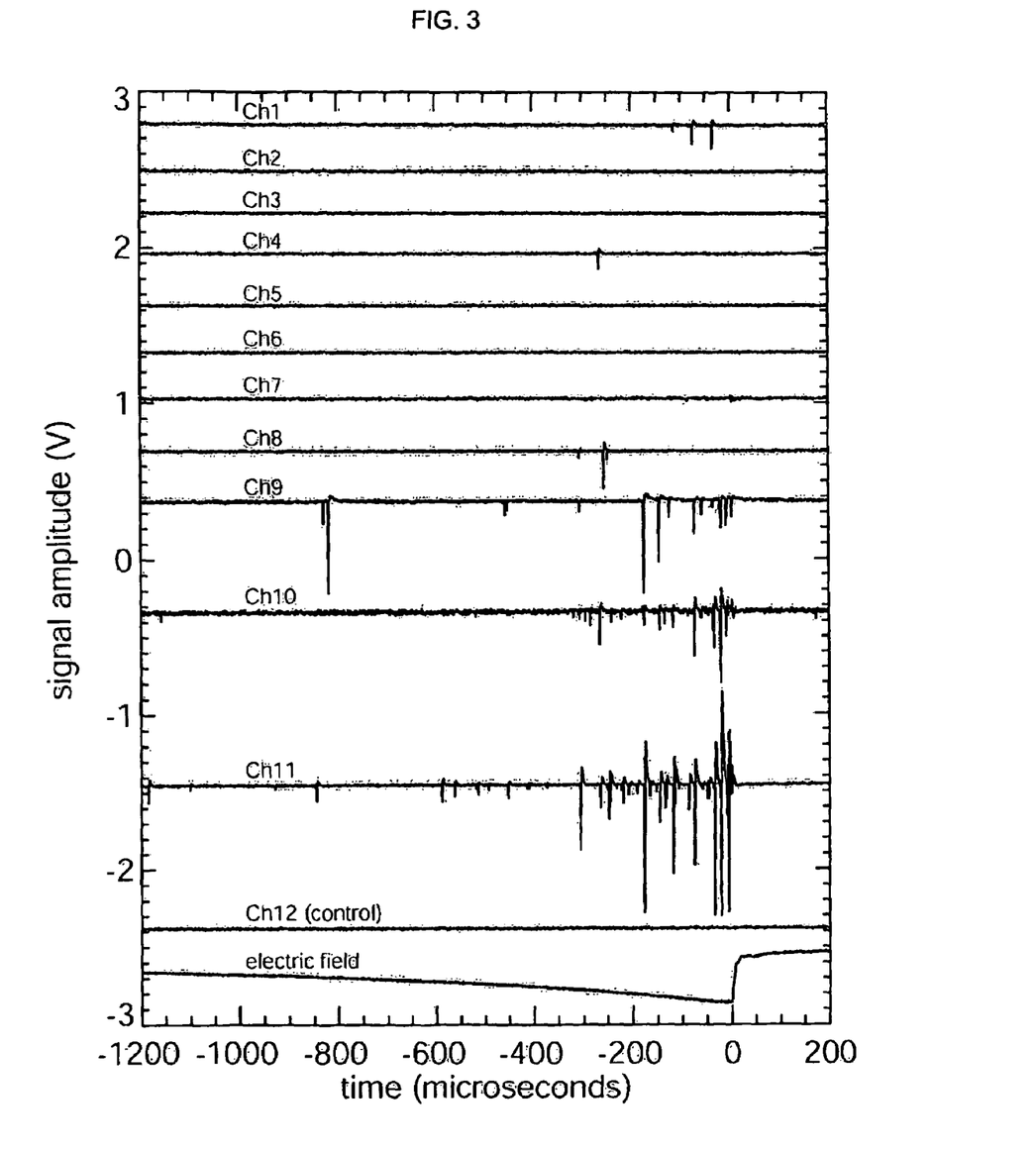
FIG. 3 shows 1.4 ms of data for 11 x-ray detectors used in an exemplary lightning detection system plus data from a control x-ray detector, as well as electric field data for a lightning flash measured on a given day.

FIG. 3 shows 1.4 ms of data for all 11 x-ray detectors plus the control detector and electric field data for a flash measured on one August testing day. Detectors Ch1-Ch9 were all at the same location. Detectors Ch 11 and Ch 12 (control) were collocated about 50 m away and Ch 10 was located on top of a 11 m tall tower, 30 m in the other direction. The distances of the individual x-ray detectors from the lightning strike location is listed in Table 1 above.

From these data, it can be seen that x-ray pulses began a little less than 1.2 ms before the return stroke (t=0) and terminate at or near the beginning of the return stroke. No signals were seen at the control detector (Ch 12). This behavior was typical of the other 4 natural lightning strikes measured, with 0.9 ms being the average time before the return stroke that the x-rays begin for the stepped leaders.

Because the signal amplitudes are a direct measure of the energy deposited at the detectors, a comparison of the attenuated signals with those from the unshielded detectors allows an estimate of the photon energies in the bursts. Using a Monte Carlo simulation, it was found that the bronze attenuator cap (Ch 8) becomes (>75%) transparent above 150 keV. Therefore, the lack of x-ray pulses on Ch 8 compared to the nearby unshielded detectors (Ch 9-Ch 11) shows that most of the x-rays have energies below about 150 keV. On the other hand, less than 25% of 250 keV x-rays penetrate the wall of the collimators (Ch 1-Ch 7), with the transmission dropping rapidly with decreasing energy. The occasional pulses seen in Ch 1-Ch 7 with only small pulses occurring at the same time on the unshielded detectors demonstrate that the energy spectrum at times extended up to a few hundred keV.

These data also demonstrate that the energetic radiation is composed of x-rays since energetic electrons would be expected lose at least several MeV when passing through the bronze cap or the collimator sides. Such electrons, if present, would produce very large signals on the unshielded detectors, which was not observed. A comparison between the three unshielded detectors, separated by up to 60 m, show that the x-ray emission from the stepped-leader, is highly pulsed and is not emitted continuously. Since x-rays at these energies do not propagate long distances through the air, the x-ray intensities must have been very large at the stepped-leader, which was about 300 m away.

Because the entire data record is 2 seconds long, the background rate is accurately determined and found to be 344 counts/sec above 100 keV and 41 counts/sec above 1 MeV for the 12.7 cm detector and much less for the other detectors. Therefore, there is only about a 1 in 4 chance the one of the smaller pulses seen in Ch 11 is due to background and a 1 in 30 chance that one of the larger pulses is due to background. The background rates for the other detectors are substantially lower due to the smaller scintillator sizes and the additional material surrounding them.

Figure 4A:
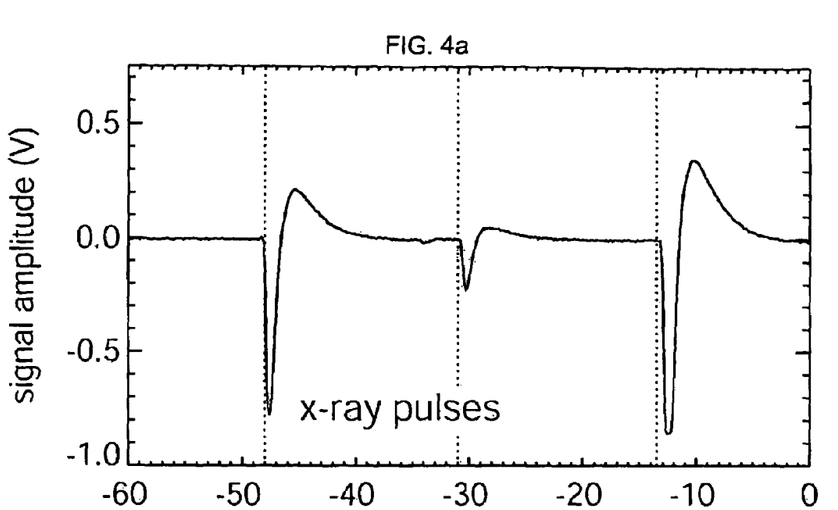
FIGS. 4(a) and (b) show x-ray and electric field waveforms, respectfully, which preceded a first return ground stroke taken on a first day. Electric field waveforms shown in FIG. 4(b) are derived from integrated dE/dt waveforms.

FIGS. 4(a) and (b) show x-ray and electric field data for a July testing day, respectively. FIGS. 5(a) and (b) show x-ray and electric field data for the August testing day described above, for the stepped-leader phases just prior to the first return strokes. In both FIGS. 4(b) and 5(b), the waveforms shown are the integrated dE/dt waveforms, that is, the electric field change with time produced by the stepped-leaders as they propagate to the ground and just before the connection to ground is made. The electric field becomes more negative as the leader brings negative charge closer to the ground. The individual steps appear as sudden drops in the electric field waveform, which have been found to only be observable at very close range, such as on the order of 100 m.

FIGS. 4(a) and 5(a) show the x-ray waveforms from the 12.7 cm detector (Ch 11). The finite width of the x-ray pulses is primarily due to the detector response and that the x-rays actually arrive at the very beginning of the pulses. The pulse shapes are in excellent agreement with the known detector response function, determined by the front-end electronic circuit and the NaI decay-time, and match the pulse shapes produced by Cs-137 and Co-60 calibration sources. The vertical dotted lines shown indicate the starting times of the leader steps as determined by the electric field data.

Time delays and uncertainties in the triggers are believed to produce a small uncertainty, at most about 11 μs, in the relative timing between the x-ray and electric field waveforms. Relative timing better than 0.1 μs has been demonstrated, such as in the range from 50 to 100 nsec. As can be seen, the x-ray pulses are very closely associated with the leader steps. Each step appears to produce an x-ray burst at a distance of 260 m. As evident by comparing FIGS. 4(a) and (b), there are a few x-ray pulses (FIG. 4(a)) that do not have an obvious association with a leader step as seen in the electric field data (FIG. 4(b)). It is possible that these x-rays originate from leader steps occurring on a more distant stepped-leader branch. The inspection of data from other dE/dt stations supports this view. Other data taken has demonstrated that X-rays precede E-steps.

Figure 4B:
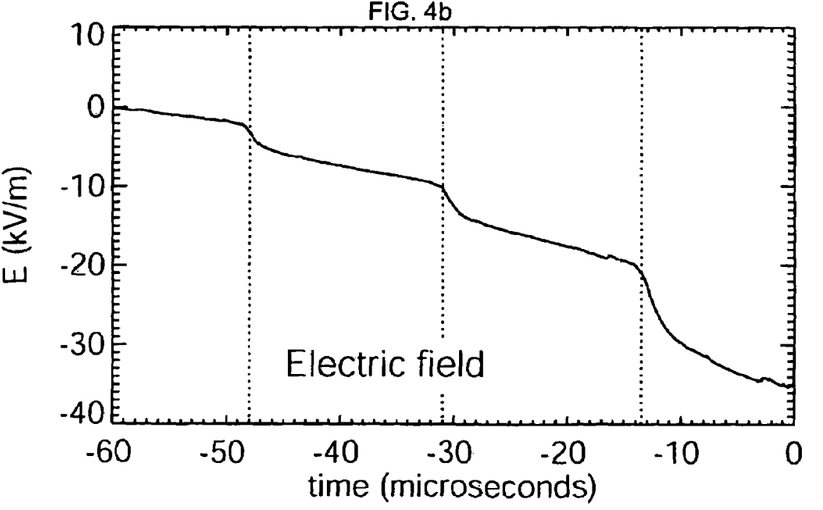
Figure 6:
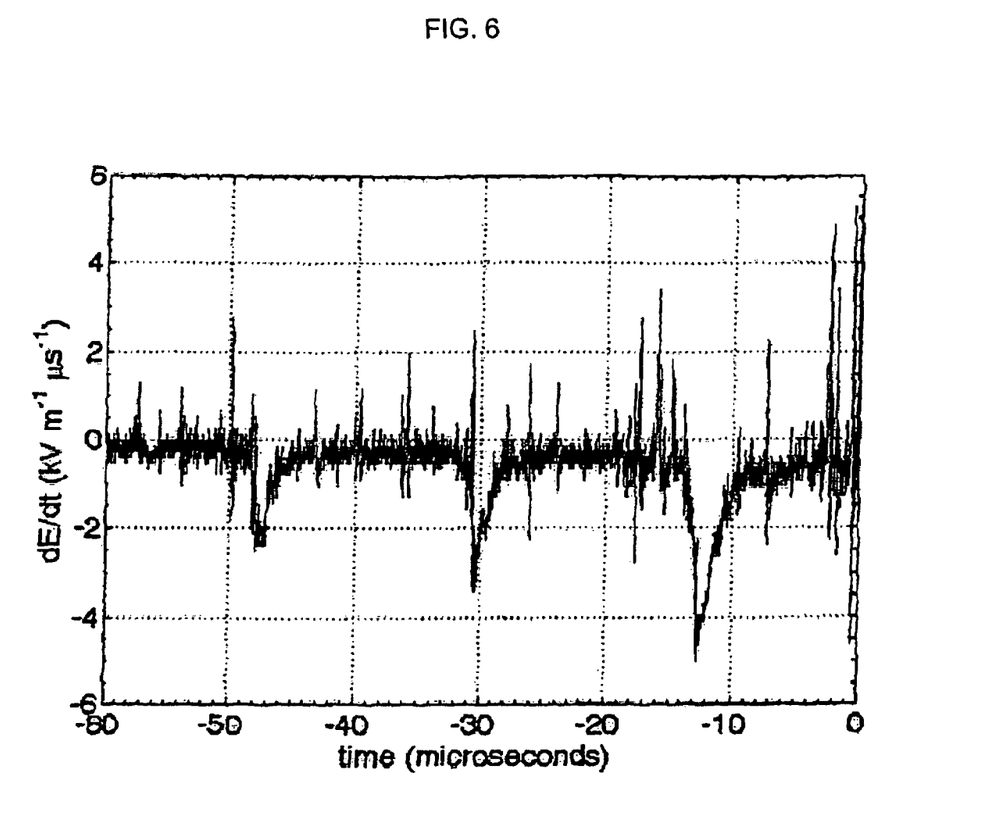
FIG. 6 shows an example of the leader step characteristics dE/dt triangular shaped pulses taken for the event having data shown in FIG. 4 observed at close range (at a distance of about 50 m).

FIG. 6 shows an example of the leader step characteristic dE/dt pulses taken for the event shown in FIG. 4 observed at close range (about 50 m). The electric field derivative signals dE/dt associated with the steps show a characteristic triangular shape. This characteristic shape makes dE/dt data easier to use to identify leader steps as compared to E data, such as shown in FIG. 4(b).

This invention can be embodied in other forms without departing from the spirit or essential attributes thereof and, accordingly, reference should be had to the following claims rather than the foregoing specification as indicating the scope of the invention.

We claim:

1. A lightning detection system, comprising:
   at least one lightning detector, wherein each of the at least one lightning detector comprises:
   at least one x-ray detector, wherein the at least one x-ray detector provides x-ray data responsive to received x-rays;
   an electric field detector, wherein the electric field detector provides data responsive to received electric fields; and
   at least one processor, wherein the at least one processor receives the x-ray data responsive to received x-rays from said at least one x-ray detector and receives the data responsive to received electric fields from said electric field detector, wherein the at least one processor determines whether lightning will strike or has struck proximate to one of the at least one lightning detector based on coincidence between one or more bursts in the received x-rays generated by a corresponding one or more lightning leader step and one or more steps in the received electric fields generated by the corresponding one or more lightning leader step.

2. The system of claim 1, wherein the data responsive to received electric field includes electric field data, wherein the at least one processor generates electric field first derivative (dE/dt) data from the electric field data provided by said electric field detector, wherein the generated electric field first derivative (dE/dt) data is used in the determination of whether lightning will strike or has struck.

3. The system of claim 1, further comprising an electrically conductive enclosure, wherein the electrically conductive enclosure encloses said at least one x-ray detector, said electric field detector, and said at least one processor, wherein the electrically conductive enclosure keeps out moisture, light, and RF noise.

4. The system of claim 1, further comprising an antenna, said antenna coupled to said electric field detector.

5. The system of claim 1, wherein said at least one processor monitors at least one of temporal characteristics, energy-related characteristics, and intensity characteristics of the x-ray data responsive to received x-rays and/or the data responsive to received electric fields and determines whether the x-ray data responsive to received x-rays and/or the data responsive to received electric fields has the at least one of the temporal characteristics, energy related characteristics, and intensity characteristics in respective predetermined ranges predetermined to indicate coincidence between one or more bursts in the received x-rays and one or more steps in the received electric fields.

6. The system of claim 1, further comprising a recorder for recording the x-ray data responsive to received x-rays and the data responsive to received electric fields.

7. The system of claim 1, wherein said system includes a clock for providing a date and time of day associated with the x-ray data responsive to received x-rays and the data responsive to received electric fields.

8. The system of claim 1, wherein said at least one lightning detector comprises a plurality of lightning detectors spaced apart from one another.

9. The system of claim 1, further comprising circuitry for shunting high voltage associated with the lightning away from electrical or electronic equipment comprising circuitry, said circuitry for shunting high voltage being communicably connected and activated by a signal from said at least one lightning detector upon said at least one signal processor determining lightning will strike.

10. The system of claim 1, wherein the data responsive to received electric fields includes electric field first derivative (dE/dt) data wherein the at least one processor uses the electric field first derivative (dE/dt) data received from the electric field detection in the determination of whether lightning will strike or has struck.

11. The system of claim 1, wherein a determination of whether lightning will strike or has struck proximate to one of said at least one lightning detector based on coincidence between one or more bursts in the received x-rays generated by the corresponding one or more lightning leader step and one or more steps in the received electric fields generated by the corresponding one or more lightning leader step is based on a burst in the received x-rays occurring within 1 µsec of a step in the received electric fields.

12. The system of claim 11, wherein electric field first derivative (dE/dt) data indicates a step in the received electric field generated by the corresponding one or more lightning leader step when the electric field first derivative (dE/dt) data has a triangular shape.

13. The system of claim 12, wherein the electric field first derivative (dE/dt) data is provided by the electric field detector.

14. The system of claim 12, wherein the electric field first derivative (dE/dt) data is generated by the at least one processor from electric field data provided by the electric field detector.

15. The method according to claim 14, wherein the x-ray data associated with received x-rays at the at least one location is received from at least one x-ray detector.

16. The method according to claim 14, wherein the electric field data associated with received electric fields at the at least one location is received from an electric field detector.

17. The method according to claim 14, wherein the electric field first derivative (dE/dt) data associated with received electric fields at the at least one location is received from an electric field detector.

18. The system of claim 1, wherein a determination of whether lightning will strike or has struck proximate to one of said at least one lightning detector based on coincidence between one or more bursts in the received x-rays generated by the corresponding one or more lightning leader step and one or more steps in the received electric field determines whether lightning will strike or has struck within 1000 m of the one of said at least one lightning detector.

19. The system of claim 1, wherein a determination of whether lightning will strike or has struck proximate to one of said at least one lightning detector based on coincidence between one or more bursts in the received x-rays generated by the corresponding one or more lightning leader step and one or more steps in the received electric field determines whether lightning will strike or has struck within 400 m of the one of said at least one lightning detector.

20. The system of claim 1, wherein a determination of whether lightning will strike or has struck proximate to one of said at least one lightning detector based on coincidence between one or more bursts in the received x-rays generated by the corresponding one or more lightning leader step and one or more steps in the received electric field determines whether lightning will strike or has struck within 300 m of the one of said at least one lightning detector.

21. The system of claim 1, wherein a determination of whether lightning will strike or has struck proximate to one of said at least one lightning detector based on coincidence between one or more bursts in the received x-rays generated by the corresponding one or more lightning leader step and one or more steps in the received electric field determines whether lightning will strike or has struck within 100 m of the one of said at least one lightning detector.

22. The system of claim 1, wherein each lightning detector comprises two or more x-ray detectors.

23. The system of claim 1, wherein the determination of whether lightning will strike or has struck proximate to one of the at least one lightning detector is a determination of whether lightning will strike proximate to one of the at least one lightning detector.

24. The system of claim 1, wherein the determination of whether lightning will strike or has struck proximate to one of the at least one lightning detector is a determination of whether lighting has struck proximate to one of the at least one lightning detector.

25. The system according to claim 1, wherein the at least one lightning detector comprises at least two lightning detectors.

26. A method of lightning detection, comprising:
analyzing x-ray data associated with received x-rays at at least one location and electric field data associated with received electric fields at the at least one location and/or electric field first derivative (dE/dt) data associated with received electric fields at the at least one location, wherein said analyzing determines whether lightning will strike or has struck proximate to one or more of the at least one location based on coincidence between one or more bursts in the received x-ray data generated by a corresponding one or more lightning leader step and one or more steps in the received electric fields generated by the corresponding one or more lightning leader steps.

27. The method of claim 26, further comprising activating a lightning protection device that protects electronics after determining that lightning will strike.

28. The method of claim 26, wherein the electric field first derivative (dE/dt) data is generated by at least one processor based on electric field data provided by an electric field detector.

29. The method of claim 26, further comprising determining a location of a lightning strike to within 100 m of an actual location of the lightning strike.

30. The method according to claim 26, further comprising: receiving the x-ray data associated with received x-rays at the at least one location and the electric field data associated with received electric fields at the at least one location and/or the electric field first derivative data (dE/dt) data associated with received electric fields at the at least one location.

31. The method of claim 26, wherein one or more suitably programmed computing devices analyze the x-ray data and the electric field first derivative (dE/dt) data to determine whether lightning will strike or has struck proximate to one or more of the at least one location based on coincidence between the x-ray data and electric field first derivative (dE/dt) data.

32. The method according to claim 11, wherein a determination of whether lightning will strike or has struck proximate to one of the at least one location based on coincidence between one or more bursts in the received x-rays generated by the corresponding one or more lightning leader step and one or more steps in the received electric field determines whether lightning will strike or has struck within 1000 m of the one of the at least one location.

33. The method according to claim 26, wherein a determination of whether lightning will strike or has struck proximate to one of the at least one location based on coincidence between one or more bursts in the received x-rays generated by the corresponding one or more lightning leader step and one or more steps in the received electric field determines whether lightning will strike or has struck within 400 m of the one of the at least one location.

34. The method according to claim 26, wherein a determination of whether lightning will strike or has struck proximate to one of the at least one location based on coincidence between one or more bursts in the received x-rays generated by the corresponding one or more lightning leader step and one or more steps in the received electric field determines whether lightning will strike or has struck within 300 m of the one of the at least one location.

35. The method according to claim 26, wherein a determination of whether lightning will strike or has struck proximate to one of the at least one location based on coincidence between one or more bursts in the received x-rays generated by the corresponding one or more lightning leader step and one or more steps in the received electric field determines whether lightning will strike or has struck within 100 m of the one of the at least one location.

36. A lightning detector, comprising:
at least one x-ray detector, wherein the at least one x-ray detector provides x-ray data responsive to received x-rays;
an electric field detector, wherein the electric field detector provides data responsive to received electric fields; and
at least one processor, wherein the at least one processor receives the x-ray data responsive to received x-rays from the at least one x-ray detector and receives the data responsive to received electric fields from the electric field detector, wherein the at least one processor determines whether lightning will strike or has struck proximate to one of the at least one lightning detector based on coincidence between one or more bursts in the received x-rays generated by a corresponding one or more lightning leader step and one or more steps in the received electric fields generated by the corresponding one or more lightning leader step.

* * * * *

UNITED STATES PATENT AND TRADEMARK OFFICE
CERTIFICATE OF CORRECTION

| | | |
|---|---|---|
| PATENT NO. | : 7,809,507 B2 | Page 1 of 1 |
| APPLICATION NO. | : 11/721280 | |
| DATED | : October 5, 2010 | |
| INVENTOR(S) | : Joseph R. Dwyer et al. | |

It is certified that error appears in the above-identified patent and that said Letters Patent is hereby corrected as shown below:

Column 2,
Line 48, "can further comprises" should read --can further comprise--.
Line 66, "being is" should read --is being--.

Column 4,
Line 36, "have also found to" should read --have also been found to--.

Column 5,
Lines 23-24, "103. detectors" should read --103. Detectors--.
Line 53, "emerge from" should read --emerges from--.

Column 6,
Line 1, "impending lightning can" should read --impending lightning strike can--.
Line 46, "such provided" should read --such as provided--.

Column 7,
Lines 51-52, "to e determine" should read --to determine--.

Column 9,
Line 48, "expected lose" should read --expected to lose--.
Line 62, "chance the one" should read --chance that one--.

Signed and Sealed this
Eighteenth Day of January, 2011

David J. Kappos
*Director of the United States Patent and Trademark Office*